United States Patent
Zajac

[11] Patent Number: 5,915,410
[45] Date of Patent: Jun. 29, 1999

[54] PNEUMATICALLY OPERATED POSITIVE SHUTOFF THROTTLE VALVE

[76] Inventor: John Zajac, 1137 Angmar Ct., San Jose, Calif. 95121

[21] Appl. No.: 08/595,128

[22] Filed: Feb. 1, 1996

[51] Int. Cl.⁶ .................................................. F16K 31/365
[52] U.S. Cl. ........................ 137/341; 251/335.3; 251/61.4
[58] Field of Search .......................... 137/341; 251/335.3, 251/335.1, 61.4

[56] References Cited

U.S. PATENT DOCUMENTS

| | | | |
|---|---|---|---|
| 1,758,644 | 5/1930 | Betts et al. | 251/61.4 |
| 2,111,230 | 3/1938 | Toussaint | 251/335.3 |
| 3,241,805 | 3/1966 | Schumann | 251/61.4 |
| 3,605,795 | 9/1971 | Rajakovics | 137/341 |
| 3,826,465 | 7/1974 | Whittaker et al. | 251/335.3 |
| 4,237,920 | 12/1980 | Norman | 251/335.3 |
| 4,431,159 | 2/1984 | Stubbs | 251/335.3 |
| 5,094,426 | 3/1992 | Zajac . | |

FOREIGN PATENT DOCUMENTS

| 1142257 | 7/1963 | Germany | 251/335.3 |
|---|---|---|---|
| 849253 | 9/1960 | United Kingdom | 137/341 |

*Primary Examiner*—A. Michael Chambers
*Attorney, Agent, or Firm*—Flehr Hohbach Test Albritton & Herbert

[57] ABSTRACT

Pneumatically operated throttle valve which provides both positive shutoff and precise flow control. The valve has a seat surrounding an orifice and a poppet movable between open and closed positions relative to the seat for controlling communication though the orifice. The poppet is urged toward one of the two positions by a spring, and the force for moving the poppet toward the other position is provided by a frictionless bellows. The poppet is provided with a needle valve for precise control of flow through the orifice, and internal heaters are provided for heating the poppet and the seat directly to prevent condensation from forming on them. The bellows in combination with a low friction bearing effectively eliminates stiction and permits precise control of the valve over its entire operating range. In one disclosed embodiment, the bellows serves as the spring which urges the poppet toward one of the two positions as well as an actuator which moves it toward the other position. The valve can be configured to be either normally open or normally closed.

26 Claims, 3 Drawing Sheets

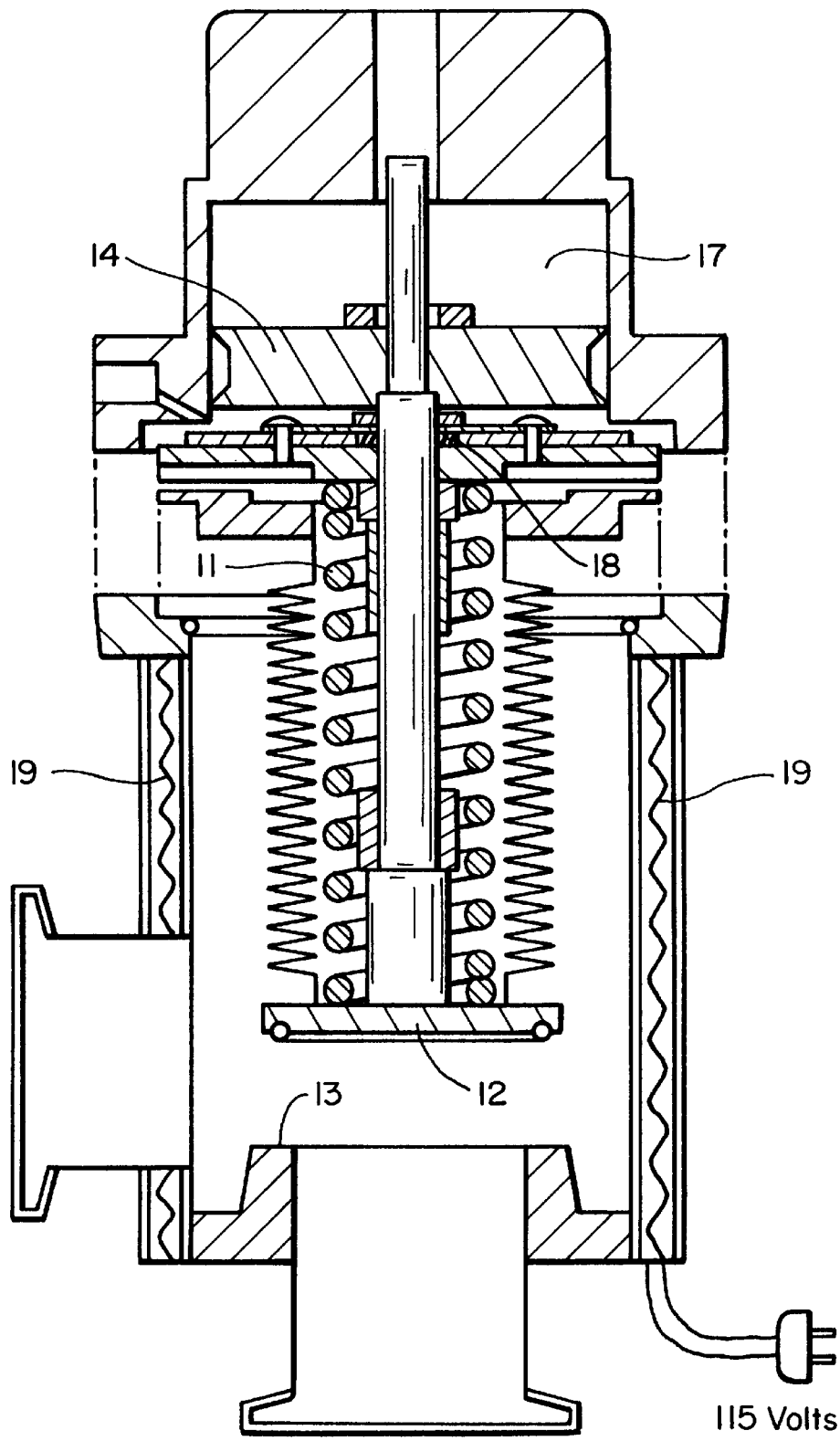
FIG_1
(PRIOR ART)

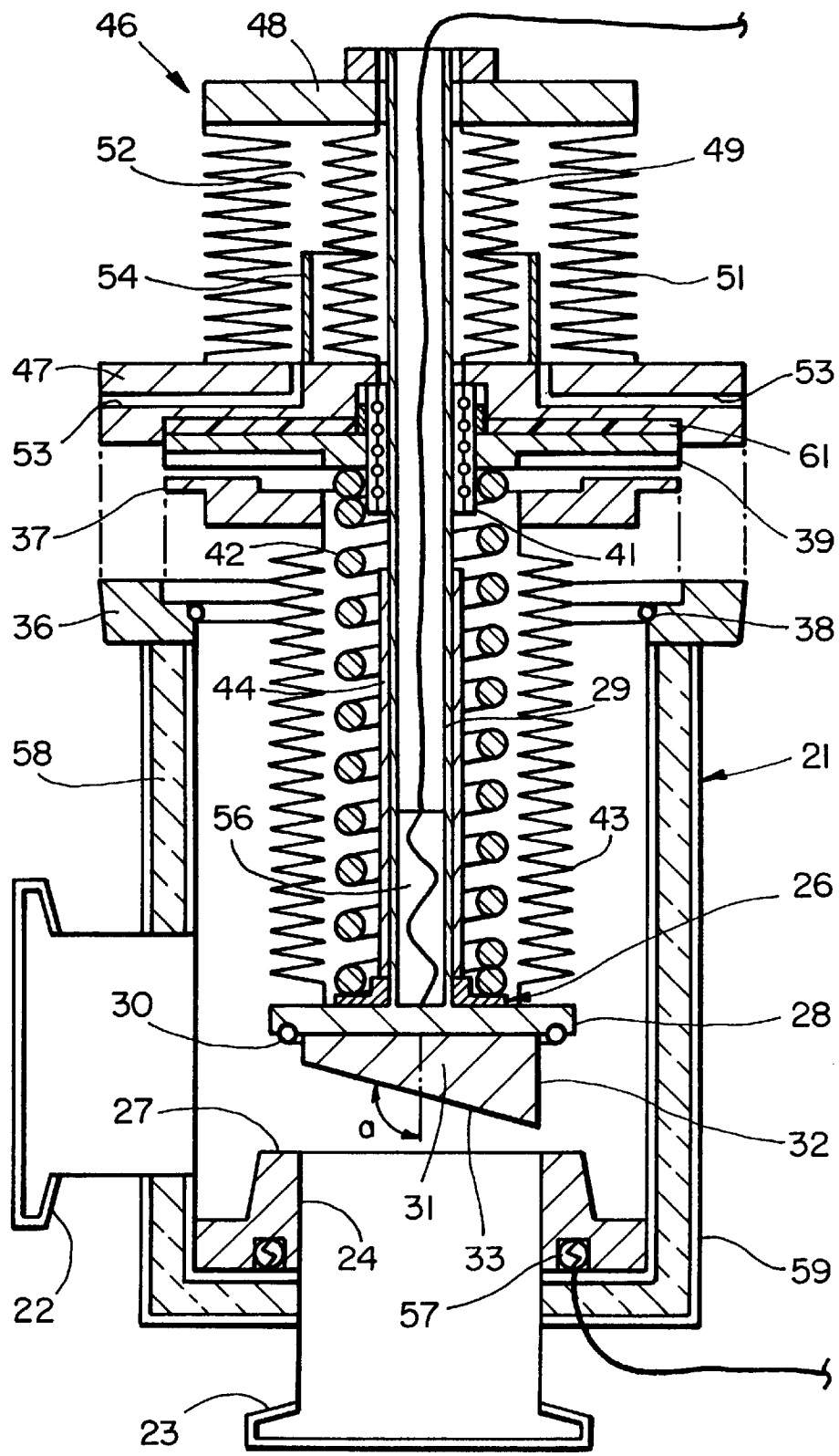
FIG_2

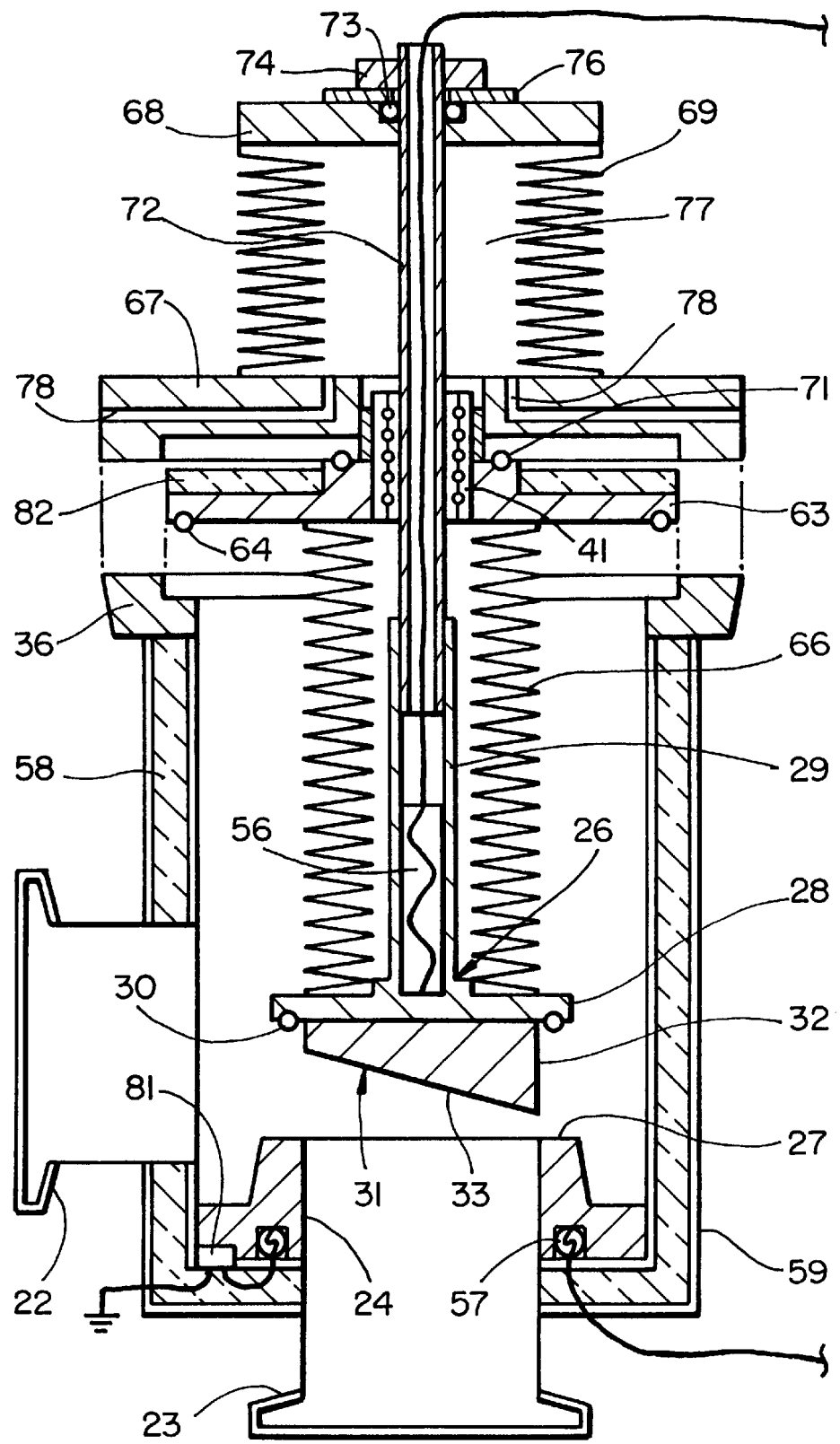
FIG_3

PNEUMATICALLY OPERATED POSITIVE SHUTOFF THROTTLE VALVE

This invention pertains generally to valves and, more particularly, to a pneumatically operated positive shutoff throttle valve.

Flow control systems, as used for example in reactors employed the manufacture of semiconductors, require valves which can provide both positive shutoff and very fine adjustment. Positive shutoff generally requires high operating forces, whereas fine adjustment requires the ability to make very small and very precise changes in the setting of the valve. These two qualities are very difficult to achieve in a single valve.

U.S. Pat. No. 5,094,426 discloses a metering valve which utilizes a stepping motor and a screw drive to provide both positive shutoff and fine adjustment. While that valve was a significant improvement over previous valves, it still has certain limitations and disadvantages. It is rather bulky, and the valve moves in discrete steps, rather being continuously adjustable. Moreover, the operating mechanism is subject to backlash which makes it even more difficult to obtain a precise adjustment.

Pneumatically operated valves have the ability to move in very small increments (millionths of an inch) and still provide the high forces required to prevent leaking. They can also avoid the problem of backlash which occurs with other types of mechanically operated valves. However, they are subject to friction and stiction which causes parts to jump when movement starts, making microscopic adjustments nearly impossible to control.

One example of a pneumatically actuated valve of the prior art is illustrated in FIG. 1. This valve has a spring 11 which urges a poppet 12 toward a seat 13 and a pneumatically operated piston 14 for drawing the poppet away from the seat against the force of the spring. In this valve, there is substantial friction due to the sliding contact between the piston and the wall of chamber 17 and between the stem of the poppet and a seal 18 which surrounds it. That friction results in stiction and jerky movement of the poppet when the piston is actuated.

The valve shown in FIG. 1 also has a heater 19 in the outer wall of the valve body. That heater is intended to warm the poppet and the valve seat to prevent the formation of condensation and the accumulation of contaminants thereon. However, with the heater located in the outer wall, the wall gets relatively hot, and a substantial amount of heat is radiated into the surrounding environment rather than being applied to the poppet and seat.

It is in general an object of the invention to provide a new and improved throttle valve.

Another object of the invention is to provide a throttle valve of the above character which is pneumatically operated.

Another object of the invention is to provide a throttle valve of the above character which overcomes the limitations and disadvantages of the prior art.

These and other objects are achieved in accordance with the invention by providing a pneumatically operated throttle valve having a seat surrounding an orifice, a poppet movable between open and closed positions relative to the seat for controlling communication though the orifice, means yieldably urging the poppet toward the closed position, a bellows connected to the poppet for moving the poppet toward the open position when expanded, and means for applying pneumatic pressure to the bellows to expand the bellows and thereby move the poppet toward the open position. The poppet is provided with a needle valve for precise control of flow through the orifice, and internal heaters are provided for heating the poppet and the seat directly to prevent condensation from forming on them.

FIG. 1 is partly exploded cross-sectional view of one embodiment of a pneumatically operated valve of the prior art.

FIG. 2 is partly exploded cross-sectional view of one embodiment of a pneumatically operated throttling valve according to the invention.

FIG. 3 is partly exploded cross-sectional view of another embodiment of a pneumatically operated throttling valve according to the invention.

As illustrated in FIG. 2, the valve includes a generally cylindrical body or housing 21 with an inlet fitting 22 in the lower portion of the side wall and an outlet fitting 23 in the bottom wall of the housing. Communication through an orifice 24 in the outlet fitting is controlled by a poppet 26 which is movable in an axial direction between open and closed positions relative to a seat 27 surrounding the orifice.

The poppet has an enlarged circular head 28 and an axially extending stem 29, with a hollow O-ring 30 fabricated of stainless steel on the outer face of the head for sealing engagement with the seat. The stainless steel O-ring is cleaner and less affected by chemicals than other types of seals, and is preferred for use in applications such reactors where corrosive chemicals are present. However, other materials can be employed, particularly in applications where corrosion is not a factor.

A tapered needle 31 projects from the outer face into the orifice to provide precise control over the flow through the valve. The needle has a cylindrical side wall 32 of slightly smaller diameter than the orifice and an end face 33 which lies in a plane which is inclined relative to the axis by an angle a on the order of 100° to 145°.

At its upper end, the side wall of the housing terminates in a flange 36 to which a top cover 37 is attached, with an O-ring 38 providing a fluid-tight seal between the flange and the cover. A plate 39 is mounted on cover 37, and the stem of the poppet passes through a bearing 41 which is carried by the plate. The bearing is a low friction linear ball bearing which is fabricated of stainless steel for operation at high temperatures, e.g. 100° C.

The poppet is urged toward its closed position by a compression spring 42 which is disposed about the stem and extends between the head of the poppet and the under side of plate 39. A bellows 43 is disposed coaxially about the spring and sealed to the head of the poppet and to top cover 37. The bellows can be fabricated of a material such as inconel for extended life and reduced maintenance. Upward travel of the poppet is limited by a sleeve 44 disposed coaxially about the poppet stem for abutting engagement with the under side of the bearing assembly.

The poppet is moved away from the seat by a pneumatically actuated bellows assembly 46. That assembly includes a base plate 47 affixed to the top of the valve housing, a top plate 48 affixed to the poppet stem, and a pair of axially extensible bellows 49, 51 disposed coaxially of each other between the plates. Each of the bellows has an axially extensible accordionlike side wall which is sealed to the plates to form a hermetically sealed chamber 52 between bellows. Flow passageways 53 are formed in base plate 47 for applying pneumatic pressure to the chamber to extend the bellows and open the valve. The bellows assembly is secured to the housing by screws (not shown) which are threadedly received in top flange 36.

A cylindrical sleeve or stop 54 extends upwardly from the base plate within the chamber for abutting engagement with the under side of top plate 48 to limit compression of the bellows by the spring 42 which closes the valve.

Means is provided for heating the poppet and the valve seat to prevent the formation of condensation and a buildup on contaminants on the poppet and seat. This means includes electrically energized heating elements 56, 57 for the poppet and seat, respectively. The stem of the poppet is hollow, and heating element 56 is disposed in the lower portion of the hollow stem near the head of the poppet. Heating element 57 is disposed in an annular recess on the under side of the seat directly below the sealing surface. The heating elements are of conventional design and can be energized by a suitable power source such as 120 volts a.c., or a lower voltage source which is isolated from the supply lines.

To contain the heat within the valve, foam insulation 58 and an outer jacket 59 are disposed about the side and bottom walls of the valve housing to help contain the heat, and an insulative spacer 61 fabricated of a material such as Bakelite is positioned between the top plate of the housing and the base plate of the bellows assembly.

In operation and use, spring 42 urges poppet 26 into tight sealing engagement with valve seat 27. To open the valve, a pneumatic pressure is applied to chamber 52 to extend the bellows and lift the poppet away from the seat. With the tapered needle 31, the flow through the valve can be controlled very precisely even with the relatively high spring force which is required to provide positive shutoff when the valve is closed. Bearing 41 is porous, and air from lower bellows 43 passes through it freely as the poppet moves up and down.

With the heating elements inside the hollow stem of the poppet and inside the valve seat, heating is done from the inside out, and this permits the poppet and seat to reach substantially higher temperatures than in the prior art of FIG. 1 where the heater is on the outside. With that arrangement, the poppet and seat can only be heated to temperatures on the order of 70° C., and the outside of the valve gets quite hot. With the heaters on the inside and the insulation on the outside, the poppet and seat can be maintained at substantially higher temperatures, and there is substantially less heat loss through radiation from the housing. The valve is only warm to the touch on the exterior.

The embodiment of FIG. 3 is generally similar to the embodiment of FIG. 2, and like reference numerals designate corresponding elements in the two embodiments. In the embodiment of FIG. 3, however, the structure is simplified somewhat, and the top cover of the housing consists of a single plate 63 which is sealed to wall flange 36 by an O-ring 64. Bearing assembly 41 is mounted in that plate, and bellows 66 extends between the head of the poppet and the under side of plate 63. There is no compression spring in this embodiment, and bellows 66 is smaller in diameter than bellows 43.

The actuator in the embodiment of FIG. 3 consists of a bellows assembly which comprises a base plate 67, a top plate 68 and a single bellows 69. Base plate 67 is attached to the wall flange 36 by screws (not shown), with an O-ring seal 71 between base plate 67 and the top plate 63 of the housing. The top plate of the bellows, i.e. plate 68, is affixed to the stem of the poppet by a hollow tube 72 which is threadedly received in the poppet stem and in plate 68. An O-ring 73 provides a fluid tight seal between the tube and the plate, with a nut 74 and a washer 76 compressing the O-ring against the tube.

Bellows 69 has an extensible side wall which is hermetically sealed to plates 67, 68 to form a chamber 77 to which pneumatic pressure is applied to expand the bellows. The pressure is applied to the chamber through passageways 78 in base plate 67.

In this embodiment, bellows 69 also provides the spring force for closing and sealing the valve. When not pressurized, it tends to collapse and drive the poppet toward the seat, whereas bellows 66 tends to move the poppet away from the seat when it collapses. Since bellows 69 is larger than bellows 66, it exerts the greater spring force, and the net spring force moves the poppet toward the seat. In order to provide proper closing and seating of the poppet, the net spring constant of the two bellows and any other resilient elements in the system is preferably about 210 lb/in for a 2 inch poppet valve.

As in the embodiment of FIG. 2, bearing 41 is porous, and air passes through it freely. In this embodiment, however, the bearing is in the pressurized chamber of the bellows assembly, and the chamber is sealed by lower bellows 66. That eliminates the need for a seal about the poppet stem and avoids the friction which would be attendant to such a seal. Since bellows 66 is of smaller diameter than bellows 69, the force exerted by it will be less than the force exerted by bellows 69 when the bellows assembly is pressurized, and pressurization of the two bellows urges the poppet toward the closed position.

There are several other differences between the embodiments of FIGS. 2 and 3. In the embodiment of FIG. 3, tube 72 serves to retain heating element 56 in poppet stem 29, and a thermostat 81 monitors the temperature of the valve seat and controls the operation of heating element 57 accordingly. Upward travel of the poppet is limited by abutment of the upper end of the poppet stem against the lower side of the bearing assembly. Also, the insulator between the top of the valve housing and the bottom of the bellows assembly consists of a ring of foam insulation 82, rather than a Bakelite spacer.

Operation and use of the embodiment of FIG. 3 is similar to that of FIG. 2, except that the popped is moved to the closed position by the compressive force of bellows 69 when that bellows is depressurized. When bellows 69 is pressurized, its side wall extends, overcoming the compressive force of the side wall and the downward force applied by bellows 66, and lifting the poppet away from the seat.

By making bellows 66 larger than bellows 69, the valve of FIG. 3 can be made normally open rather than normally closed. With bellows 66 having the greater spring constant, the net spring force will lift the poppet away from the seat when the bellows are not pressurized. When the bellows are pressurized, bellows 66 will apply the greater force, and the net force will drive the poppet toward the seat.

With a normally open valve, bellows 69 can be eliminated and replaced with a cap or other suitable means for sealing off the upper side of the bearing. The pneumatic pressure is then applied directly to bellows 66, and that bellows provides both the spring force which closes the valve and the pneumatic force which opens it.

The invention has a number of important features and advantages. Since it can be configured to be either normally open or normally closed, it has the unique ability to fail open or fail closed, as the situation may require. This is an important advantage since it makes it possible to ensure that the valve will be put in its safest position in the event of a loss of power or other emergency. It is especially important with flammable, explosive, corrosive or toxic gases.

The bellows assembly provides a frictionless spring mechanism and actuator which provides continuous and accurate adjustment of the valve. Precise control is further enhanced by the needle valve on the face of the poppet. With heat applied directly to the poppet and to the valve seat, the valve is heated from the inside out, which results in more efficient use of the heat, higher temperatures at the seal between the poppet and seat, and lower temperatures on the outside of the valve. The pneumatic actuator is also more compact than a stepping motor and other types of actuators.

The combination of the frictionless bellows and the low friction guide bearings is particularly significant from the standpoints of speed and stability. With essentially no friction, the valve can be adjusted in very small (microscopic) increments, and the changes can be made quite rapidly, i.e. faster than pressure changes in gasses controlled by the valve. This gives the valve significant advantages over prior art valves with mechanical actuators and friction.

The low friction bearing is important in avoiding stiction which can otherwise occur in a pneumatically operated valve. With stiction, the poppet would tend to remain in a given position, e.g. against the seat, as pressure built up in the bellows, then jump when the pressure reaches a level sufficient to overcome the stiction. That would make it impossible to control movement of the valve away from the seat with any degree of precision. By eliminating stiction, precise control is provided both when the poppet is against the seat and throughout the entire operating range of the valve.

It is apparent from the foregoing that a new and improved pneumatically operated throttling valve has been provided. While only certain presently preferred embodiments have been described in detail, as will be apparent to those familiar with the art, certain changes and modifications can be made without departing from the scope of the invention as defined by the following claims.

I claim:

1. In a pneumatically operated throttle valve: a seat surrounding an orifice, a poppet movable between open and closed positions relative to the seat for controlling communication though the orifice, means supporting the poppet for substantially stiction-free movement between the open and closed positions, means yieldably urging the poppet toward the one of the two positions, a bellows connected to the poppet for moving the poppet toward the other position when expanded, and means for applying pneumatic pressure to the bellows to expand the bellows and thereby move the poppet toward the open position.

2. The throttle valve of claim 1 further including means carried by the poppet and the seat for heating the poppet and the seat to prevent condensation from forming on them.

3. The throttle valve of claim 2 wherein the poppet has a hollow stem, and the means for heating the poppet comprises a heating element in the hollow stem.

4. The throttle valve of claim 1 wherein the poppet includes a tapered needle which extends into the orifice to control flow through the orifice.

5. The throttle valve of claim 1 including a hollow stainless steel O-ring carried by the poppet for sealing engagement with the seat.

6. In a pneumatically operated throttle valve: a seat surrounding an orifice, a poppet having a head adapted for sealing engagement with the seat and a stem extending axially from the head, a first plate mounted in a fixed position facing the seat, a low friction bearing mounting the stem to the plate for substantially stiction-free movement of the poppet toward and away from the seat, resilient means disposed between the head and the first plate for yieldably urging the poppet toward the seat, a second plate connected to the stem on the side of the first plate opposite the seat, a bellows having an axially extensible accordion-like wall extending between the first and second plates, and means for applying pneumatic pressure to the region bounded by the bellows wall and the plates to extend the bellows and thereby move the poppet away from the seat.

7. The throttle valve of claim 6 further including means carried by the poppet and the seat for heating the poppet and the seat to prevent condensation from forming on them.

8. The throttle valve of claim 7 wherein the stem is hollow, and the means for heating the poppet comprises a heating element in the hollow stem.

9. The throttle valve of claim 6 including a tapered needle which extends from the head of the poppet into the orifice to control flow through the orifice.

10. The throttle valve of claim 7 wherein the head of the poppet includes a hollow stainless steel O-ring for sealing engagement with the seat.

11. In a pneumatically operated throttle valve: a seat surrounding an orifice, a poppet having a head for sealing engagement with the seat and a stem which extends in an axial direction from the head, a first plate mounted in a fixed position facing the seat, a low friction bearing mounting the stem to the first plate for substantially stiction-free movement of the poppet toward and away from the seat, resilient means disposed between the head and the first plate for yieldably urging the poppet toward the seat, a second plate connected to the stem on the side of the first plate opposite the seat, a first bellows having an axially extensible accordion-like wall extending between the first and second plates, a second bellows having an axially extensible accordion-like wall of greater diameter than the wall of the first bellows disposed concentrically about the first bellows and extending between the two plates to form a closed chamber between the two bellows walls and the two plates, and means for applying pneumatic pressure to the chamber to extend the bellows walls and thereby move the poppet away from the seat.

12. The throttle valve of claim 11 wherein the means for urging the poppet toward the seat includes a compression spring disposed coaxially about the stem.

13. The throttle valve of claim 12 further including a third bellows disposed coaxially about the spring.

14. The throttle valve of claim 12 further including means carried by the poppet and the seat for heating the poppet and the seat to prevent condensation from forming on them.

15. The throttle valve of claim 12 including a tapered needle which extends from the head of the poppet into the orifice to control flow through the orifice.

16. In a pneumatically operated throttle valve: a seat surrounding an orifice, a poppet having a head for sealing engagement with the seat and a stem which extends in an axial direction from the head, a first plate mounted in a fixed position facing the seat, a low friction, pneumatically permeable bearing mounted in the first plate and supporting the poppet for axial movement relative to the seat, a second plate connected to the stem on the side of the first plate opposite the seat, a bellows having an axially extensible side wall sealed to the first and second plates to form a closed chamber, the side wall of the bellows applying a spring force which urges the poppet toward the seat, means for applying pneumatic pressure to the chamber to extend the bellows and thereby move the poppet away from the seat, and a second bellows sealed to the first plate and to the head of the poppet for containing any gas passing through the bearing from the chamber.

17. The throttle valve of claim 16 further including means carried by the poppet and the seat for heating the poppet and the seat to prevent condensation from forming on them.

18. The throttle valve of claim 16 including a tapered needle which extends from the head of the poppet into the orifice to control flow through the orifice.

19. In a pneumatically operated throttle valve: a seat surrounding an orifice, a poppet movable between open and closed positions relative to the seat for controlling communication though the orifice, means supporting the poppet for substantially stiction-free movement between the open and closed positions, an actuator comprising a bellows connected to the poppet for moving the poppet relative to the seat, and means for applying pneumatic pressure to the bellows to expand the bellows and thereby move the poppet.

20. The throttle valve of claim 19 further including means carried by the poppet and the seat for heating the poppet and the seat to prevent condensation from forming on them.

21. The throttle valve of claim 19 wherein the poppet includes a tapered needle which extends into the orifice to control flow through the orifice.

22. The throttle valve of claim 19 wherein the bellows urges the poppet toward the seat with a force sufficient to seal the poppet against the seat when the pneumatic pressure is not applied to the bellows.

23. The throttle valve of claim 19 wherein the bellows urges the poppet away from the seat when the pneumatic pressure is not applied to the bellows.

24. In a pneumatically operated throttle valve: a seat surrounding an orifice, a poppet movable between open and closed positions relative to the seat for controlling communication though the orifice, means supporting the poppet for substantially stiction-free movement between the open and closed positions, a resilient bellows which urges the poppet toward the seat with a force sufficient to maintain the poppet in sealing engagement with the seat, and means for applying pneumatic pressure to the bellows to expand the bellows and thereby move the poppet away from the seat.

25. In a pneumatically operated throttle valve: a seat surrounding an orifice, a poppet movable between open and closed positions relative to the seat for controlling communication though the orifice, means supporting the poppet for substantially stiction-free movement between the open and closed positions, a resilient bellows which urges the poppet away from the seat when the bellows is not pressurized, and means for applying pneumatic pressure to the bellows to expand the bellows and thereby move the poppet toward the seat.

26. In a pneumatically operated throttle valve: a seat surrounding an orifice, a poppet movable between open and closed positions relative to the seat for controlling communication though the orifice, a low friction bearing guiding the poppet for substantially stiction-free movement between the open and closed positions, a bellows connected to the poppet for moving the poppet relative to the seat, and means for applying pneumatic pressure to the bellows to expand the bellows and thereby move the poppet relative to the seat.

* * * * *